(12) United States Patent
Calvert et al.

(10) Patent No.: US 7,379,854 B2
(45) Date of Patent: May 27, 2008

(54) METHOD OF CONDITIONING A RANDOM FIELD TO HAVE DIRECTIONALLY VARYING ANISOTROPIC CONTINUITY

(75) Inventors: Craig S. Calvert, Houston, TX (US);
Thomas A. Jones, Bellaire, TX (US);
Glen W. Bishop, Seabrook, TX (US);
Tingting Yao, Pearland, TX (US); J. Lincoln Foreman, Houston, TX (US);
Yuan Ma, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 688 days.

(21) Appl. No.: 10/643,343

(22) Filed: Aug. 19, 2003

(65) Prior Publication Data

US 2004/0122634 A1 Jun. 24, 2004

Related U.S. Application Data

(60) Provisional application No. 60/434,943, filed on Dec. 19, 2002.

(51) Int. Cl.
*G06G 7/48* (2006.01)
*G06G 7/50* (2006.01)
*G01V 1/40* (2006.01)
*G01V 3/18* (2006.01)
*G01V 5/04* (2006.01)
*G01V 9/00* (2006.01)
*G06F 19/00* (2006.01)

(52) U.S. Cl. .................. 703/10; 703/6; 703/9; 702/9; 702/10; 702/11; 702/12; 702/13

(58) Field of Classification Search ............... 703/9, 703/10, 11, 6; 702/14, 16, 9–13
See application file for complete search history.

(56) References Cited

U.S. PATENT DOCUMENTS

| | | | | |
|---|---|---|---|---|
| 4,471,357 | A * | 9/1984 | Wu et al. ................. | 342/25 D |
| 4,809,238 | A | 2/1989 | Bishop et al. ............... | 367/46 |
| 4,910,786 | A | 3/1990 | Eichel ........................ | 382/199 |
| 5,671,136 | A | 9/1997 | Willhoit, Jr. ................ | 702/18 |
| 5,691,958 | A | 11/1997 | Calvert et al. ............... | 367/73 |
| 5,693,885 | A | 12/1997 | Neidell ........................ | 73/597 |
| 5,729,451 | A | 3/1998 | Gibbs et al. ................. | 702/12 |
| 5,808,966 | A | 9/1998 | Calvert et al. ............... | 367/73 |
| 5,838,634 | A | 11/1998 | Jones et al. .................. | 367/73 |
| 5,848,379 | A * | 12/1998 | Bishop ........................ | 702/6 |

(Continued)

OTHER PUBLICATIONS

Ram, A. and J.P. Narayan. "Synthetic Seismograms for a Layered Earth Geological Model Using the Absorption and Dispersion Phenomena." Pure and Applied Geophysics. vol. 149, Issue 3, pp. 541-551. (1997). Abstract Only.*

(Continued)

*Primary Examiner*—Paul Rodriguez
*Assistant Examiner*—Ayal Sharon (57) ABSTRACT

The present invention is a method of generating a model of a random field which has directionally varying continuity. First, a tentative model for the random field is specified. Second, connected strings of nodes within the model are identified. Third, a spectral simulation on each of the strings of nodes is performed to determine updated values for the random field. Finally, the tentative model is updated with the data values from the spectral simulations.

18 Claims, 5 Drawing Sheets

U.S. PATENT DOCUMENTS

| | | | |
|---|---|---|---|
| 6,067,340 | A | 5/2000 | Eppstein et al. ............ 378/4 |
| 6,131,071 | A * | 10/2000 | Partyka et al. ............ 702/16 |
| 6,178,381 | B1 | 1/2001 | Padhi et al. ............ 702/18 |
| 6,324,478 | B1 | 11/2001 | Popovici et al. ............ 702/18 |
| 6,343,256 | B1 | 1/2002 | Winbow et al. ............ 702/18 |
| 6,480,790 | B1 * | 11/2002 | Calvert et al. ............ 702/14 |
| 2002/0042702 | A1 * | 4/2002 | Calvert et al. ............ 703/10 |
| 2003/0115029 | A1 * | 6/2003 | Calvert et al. ............ 703/10 |
| 2003/0182093 | A1 * | 9/2003 | Jones et al. ............ 703/11 |

OTHER PUBLICATIONS

Featherstone, W and Strangeways, H.J. "A Fast, Efficient Approach to Implementing SRDF Techniques." 8th Int'l Conf. on HF Radio Systems and Techniques. 2000. pp. 123-126.*

Manikas, A. et al. "Study of the Detection and Resolution Capabilities of a One-Dimensional Array of Sensors by Using Differential Geometry." IEE Radar, Sonar and Navigation. Apr. 1994. vol. 141, Issue 2, pp. 83-92.*

Xu (1996) "Conditional Curvilinear Stochastic Simulation Using Pixel-Based Algorithms", Math Geology, V. 28, 1996.

Jones, T.A., 2001. Using Flowpaths and Vector Fields in Object-Based Modeling: Computers & Geosciences, v. 27, p. 133-138.

Pardo-Iguzquiza, E., and Chica-Olmo, M., (1993) "The Fourier Integral Method: An Efficient Spectral Method for Simulation of Random Fields" Math. Geology, v. 25.

U.S. Appl. No. 10/105,664, filed Mar. 25, 2002, Jones et al.

PCT International Search Report (4 pages) accompanied by Applicants comments (5 pages) Apr. 14, 2004.

* cited by examiner

METHOD OF CONDITIONING A RANDOM FIELD TO HAVE DIRECTIONALLY VARYING ANISOTROPIC CONTINUITY

This application claims the benefit of U.S. Provisional Application No. 60/434,943 filed Dec. 19, 2002.

FIELD OF THE INVENTION

This invention relates to a method of conditioning a multi-dimensional random field. More specifically, this invention relates to a method of controlling the local direction of maximum rock-property continuity in a geologic model.

BACKGROUND OF THE INVENTION

Geologic models are commonly used in the petroleum exploration and production industry to characterize petroleum reservoirs and depositional basins. The term "geologic model" may represent either the entire volume of a subsurface volume of interest to an analyst, or a single region of interest within that larger subsurface volume. Geologic models are generally in the form of a three-dimensional array of blocks, sometimes referred to as cells. Furthermore, geologic modeling techniques frequently refer to nodes within a model; each such node generally falls at the center of any such block or cell. Occasionally models are in the form of an array of points, in which case each point is a node. However, hereafter, without limitation, geologic models will be referred to as being constructed of an array of blocks.

A geologic model's characterization of the subsurface derives from the assigning of geologic rock properties, such as lithology, porosity, acoustic impedance, permeability, and water saturation, to each of the blocks in the model. The process of assigning values to the blocks is generally constrained by stratigraphic or structural surfaces and boundaries, such as facies changes, that separate regions of different geologic and geophysical properties within the subsurface. Because geologic models are frequently used to simulate the performance of a reservoir over time, the importance of accurately assigning the values to each of the blocks results from the fact that the spatial continuity of the rock properties in a petroleum reservoir can significantly influence fluid flow from the reservoir. More accurate geologic model characterizations of rock-property spatial continuity allow more accurate planning of the production that can be attained from the reservoir. For this reason, methods of improving the accuracy of the characterization of rock-property spatial continuity in geologic models are desired.

Industry presently uses geostatistical algorithms to characterize the three-dimensional spatial continuity of a rock property in a geologic model. These algorithms use a variogram to quantify the spatial variability of the rock property as a function of both separation distance and direction between individual blocks in the model. Another form of geostatistical simulation is spectral simulation, which uses the amplitude spectrum to control the three-dimensional continuity of rock properties within the model. The amplitude spectrum is the frequency-domain representation of the variogram. There are several advantages of spectral simulation over more traditional geostatistical simulation methods that use variograms. These advantages include computation speed, particularly when using the fast Fourier transform, and the ability to directly measure and model rock-property continuity as a function of continuity scale (spectral frequency), a feature unique to spectral simulation.

Nevertheless, all geostatistical algorithms, including spectral simulation, at present suffer from the limiting assumption of stationarity in the geologic characteristics of the modeled subsurface region. In other words, geostatistical algorithms assume that a modeled rock property can be represented by a single set of statistical measures, which are often referred to as global measures. For example, a single global variogram model or amplitude spectrum would be used to represent the spatial continuity of the modeled rock property over all blocks of the entire model. The variogram or spectrum defines both the desired range (magnitude or separation distance) and dominant direction of the continuity, assuming an anisotropic model. A limitation of this method, however, is that it is well known in the art that the geologic characteristics of the subsurface are non-stationary. Specifically, the spatial continuity of a rock property may change locally within the model, sometimes according to predictable or measurable trends. These local changes will be referred to as local measures, and may be characterized by local variogram models.

For example, consider the sediments deposited in a river channel. Paleo-hydrodynamics control the distribution of the lithological and petrophysical properties within this channel. It is understood in the art that the continuity of these properties is anisotropic—typically greatest along the channel and less continuous across channel. It is also understood that sinuosity may cause channel reaches to locally vary in direction; therefore, rock-property continuity will also locally vary in direction. Most geostatistical methods do not allow the direction of continuity to vary spatially, but instead impose the limitation of a single direction of maximum continuity on the model.

Very few geostatistical modeling methods have attempted to address this limitation. Xu (1996) developed a geostatistical algorithm that can model locally varying orientations of the rock properties. When assigning a rock-property value to a geologic-model block, the variogram orientation is rotated to match the local orientation of rock-property continuity. Azimuths assigned to each geologic model block represent this local orientation. Azimuths are distances in angular degrees, generally in a clockwise direction from north. These azimuths may be obtained from any source, including well or seismic data interpretation. However, when assigning a property value to a geologic-model block, this method must assume an identical local orientation of rock-property continuity for all blocks within the local search radius, even if the azimuths differ for each block. This limits the ability to model locally rapid changes in continuity orientation. In addition, the method is a variant of traditional geostatistical algorithms that use variograms and, as compared to spectral simulation, suffers from the limitations noted above.

More recently, Jones et al. described, in a co-pending patent application titled "Method for Locally Varying Spatial Continuity in Geologic Models," a method of building geologic models in which the direction of greatest continuity bends spatially according to geologic or geophysical interpretation. This interpretation leads to the path and orientation of maximum continuity, defined by a thalweg. A thalweg is a reference line, often a centerline, through an interpreted geologic feature, such as a seismically interpreted channel complex. The fundamental idea behind the method is to transform the coordinate system prior to modeling so that the thalweg is linear in a new coordinate system. Standard geostatistical methods may be used in the new coordinate system, which then involves a constant orientation of continuity. After geostatistical simulation, the original coordinate system is restored, providing a model in which continuity follows the path of the thalweg. This invention works well to condition rock-property continuity in geologic features that can be associated with and described by a single thalweg; i.e., features with continuity directions that align with a single thalweg, such as a channel feature. However, the invention does not work well to condition rock-property continuity in geologic features or regions having more complex continuity patterns; i.e., features with continuity directions that cannot be defined by a single thalweg, such as a complex deltaic geometry.

There is a need for a method whereby the direction of maximum continuity within a random field, such as a three-dimensional geologic model, can be locally varied. More specifically, there is a need for a method which allows the modeler to vary the direction of maximum rock-property continuity at any location in the geologic model according to local azimuth and/or dip information, using spectral simulation as the geostatistical modeling method. Any such method should allow use of information from geologic or geophysical data to determine or deduce the extent to which continuity locally varies in a specific direction within the modeled region of the subsurface, and thereby provide the ability to accurately represent this variability within the geologic model and to simulate reservoir flow performance which reflects this variability. The present invention satisfies that need.

SUMMARY

The present invention is a method of generating a model of a random field which has directionally varying continuity. First, a tentative model for the random field is specified. Second, connected strings of nodes within the model are identified. Third, a spectral simulation on each of the strings of nodes is performed to determine updated values for the random field. Finally, the tentative model is updated with the data values from the spectral simulations.

BRIEF DESCRIPTION OF THE DRAWINGS

The features of the present invention will become more apparent from the following description in which reference is made to the drawings appended hereto.

FIG. 6 depicts an example of the results of implementation of the present invention, where

Changes and modifications in the specifically described embodiments can be carried out without departing from the scope of the invention, which is intended to be limited only by the scope of the appended claims.

DESCRIPTION OF THE INVENTION

This invention is a method to model random fields having one or more regions that contain attributes having locally varying directions of continuity. The invention may be used to construct geologic models that contain locally varying directions of rock-property continuity. However, the reference to geologic models herein is for convenience and is not intended to be limiting.

The method is most beneficially applied to random fields, and specifically geologic models, having the following characteristics:

(1) The dataset for which the model is to be generated is two- or three-dimensional and contains at least one property having anisotropic spatial continuity.

(2) The anisotropic continuity at any node in the model to be generated can be represented by two (for two-dimensional datasets) or three (for three-dimensional datasets) orthogonal vectors. Each such vector will be assigned a magnitude which represents the range of spatial continuity in the orientation of that vector. At each node, one of the vectors represents the orientation of maximum spatial continuity at that node. The second vector, and third vector for three-dimensional datasets, represents the magnitude of continuity perpendicular to the first vector. The vectors may be considered as unidirectional (modulus 360°) or bi-directional (modulus 180°). In other words, the orientation, which is also referred to as the azimuth, of the vectors can point either upstream or downstream. In such a model continuity is not tied to a presumed downstream direction of flow, but is merely aligned so that the azimuth (+/−180°) is along the flow direction. For example, a 90° azimuth actually represents the east-west direction (90° or 270° having the identical meaning in this definition), independent of the direction, east or west, that a modeler might presume from other data was the direction of flow.

(3) The orientation of maximum continuity can vary from node to node in the model. The orientation is represented by a grid of azimuths and/or dips, each of which can be measured or interpreted at each node using any practical means. The azimuths and/or dips are specified at the nodes of the geologic-model. As will be understood to those skilled in the art, an azimuthal grid specifies variations in continuity within a horizontal plane of a model (in other words continuity which varies with respect to compass heading), and a dip grid specifies variations in continuity within a vertical plane of a model (in other words continuity which varies as features dip vertically). For geologic modeling, these parameters are typically derived from interpretation of geologic, well, and/or seismic data. Either azimuths or dips, as a grid, are required if two-dimensional directional variations occur within a plane of a geologic model, depending on whether the analysis is being performed for horizontal or vertical two-dimensional planes. Both azimuths and dips, as a volume, are required if the analysis is intended to model three-dimensional directional variations which occur within the geologic model volume.

The most common geologic-modeling application of the method of the present invention is to control the directional variation in continuity within each two-dimensional stratigraphic layer in a three-dimensional geologic model. The three-dimensional geologic model is composed of a stack of two-dimensional stratigraphic layers; each layer is exactly one geologic-model block in thickness and is parallel to the assumed or measured subsurface stratigraphic layering. Therefore, each layer can be treated by the method of this invention as a horizontal plane of blocks. The directional variation in continuity within each of these planes is represented by a two-dimensional grid of azimuths, in other words directional variations that occur along the stratigraphic layer. Note that in two-dimensional applications of the present invention the vertical orientation in the model is orthogonal to the stratigraphic layer, and therefore vertical continuity is effectively independent of the local azimuth angle. As a result, continuity in the vertical direction can be modeled separately, in other words either independent of the present method or in a separate application of the present method to a model having vertical layers. In addition, three-dimensional applications of the present method may be employed which simultaneously model vertical continuity.

The method of the invention can be described, without limitation, as comprising four basic steps. First, a tentative model is constructed in the space domain. The space domain is the physical space of interest to the analyst and for geologic applications comprises the three-dimensional array of blocks discussed above. The model is tentative in the sense that spatial continuity of the modeled property is not optimal and is intended to be modified using this method.

Second, a grid of azimuths and/or dips that represent local variations in continuity direction within the model are specified at the nodes of the blocks of the tentative model. The grid is used to identify sequences of nodes in the grid that are connected, in other words are adjacent in space and are generally aligned along the local orientation of maximum continuity assigned to the nodes.

Third, for each of the identified sequences, a spectral simulation of the property is performed. An amplitude spectrum is assumed for this simulation which represents the desired maximum spatial continuity in the orientation represented by the assigned azimuths and/or dips. The result is a new simulated property value for each node in the sequence.

Fourth, and finally, the simulated property values for specified nodes in each sequence replace the values in those nodes in the initially-created tentative model, resulting in a new model having anisotropic spatial continuity that changes in direction according to the input azimuths and/or dips.

Numerous embodiments of the present method are within the scope of this invention. The following described embodiments are representative.

Figure 1:
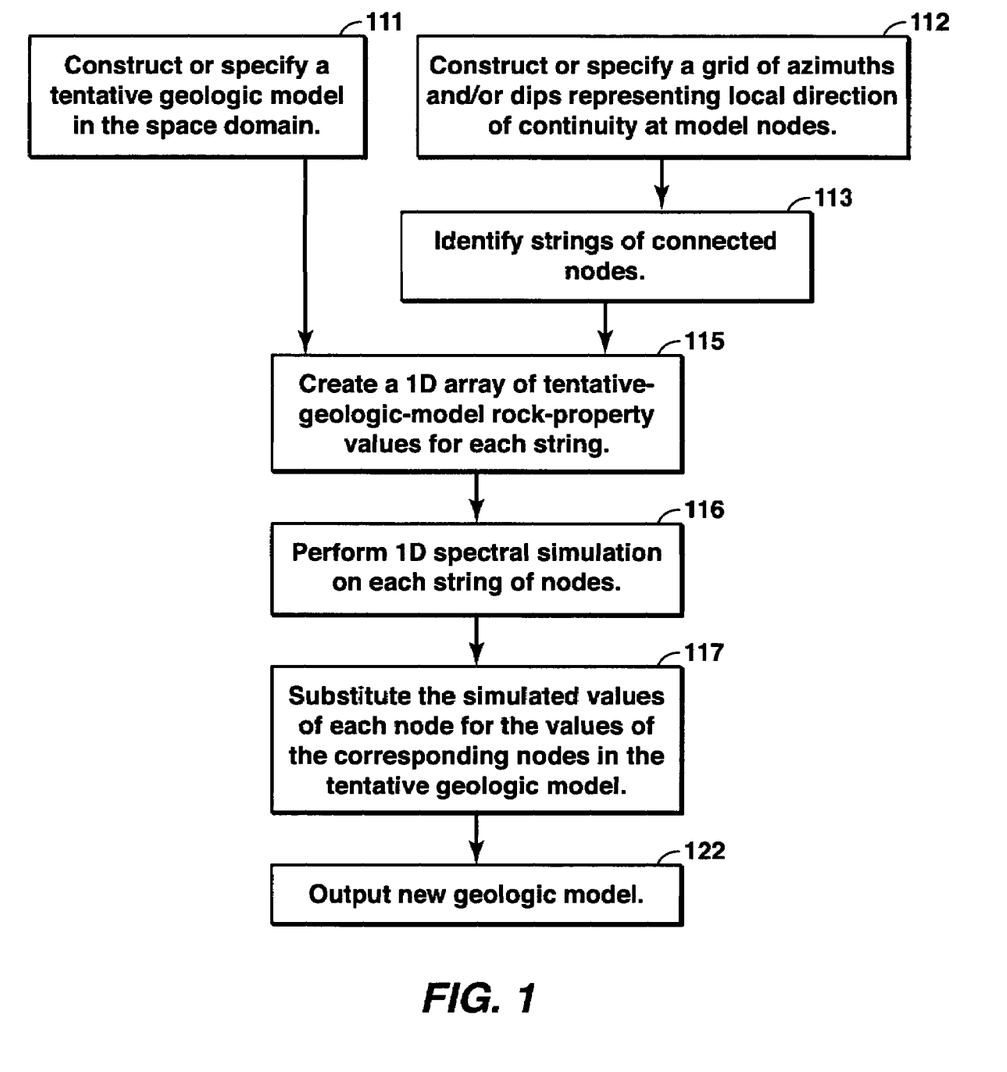
FIG. 1 depicts a flow chart of the steps for implementation of a first embodiment of the present invention.

A first embodiment of the present method is directed to the simulation of continuity in a single dimension; locally, that dimension is represented by the orientation of maximum continuity. For example, for a given tentative geologic model, it may be assumed that the local continuity variations that are present in a tentative model for all directions other than that represented by a single local azimuth and/or dip of interest are desirable and do not need to be modified. In such a case the present method is applied to simulate the model's rock properties in the single dimension, whether azimuthal or dip-oriented. FIG. 1 shows the steps for implementing this embodiment, as further described below.

First, using any practical means, a tentative, multi-dimensional geologic model, FIG. 1, step 111 is created. The tentative model is generated by assigning at least one rock property value to each block within the model's grid. This process will be well known to practitioners of geologic modeling, and can be performed, for example, by using traditional geologic-modeling schemes, such as geostatistical modeling, and/or by relying on trends present in available measurement data. Preferably, the tentative model should honor all criteria that the model is intended to accurately characterize, with the exception of the desired continuity trend that this embodiment of the present invention is intended to simulate.

Second, using any practical means, a grid of azimuths and/or dips that represent local variations in continuity direction within the geologic model is generated, FIG. 1, step 112. This grid is specified at nodes corresponding to the blocks in the tentative model.

Third, using the grid of azimuths and/or dips, "strings" of nodes in the grid that are "connected" are identified, FIG. 1, step 113. "Connected" nodes are adjacent in space and are generally aligned along the local orientation of maximum continuity assigned to the nodes. The purpose of this step is to identify strings of nodes for which model properties are to be determined according to the present method which are consistent with and accurately characterize the trend of spatial continuity associated with each of the strings. This step is preferably repeated until all nodes have been associated with one of a plurality of strings. Each node will only be associated with one such string, and the length of each such string may vary from as little as one node, such as in situations where an edge of the model, a facies boundary, or another string indicates that a node has no clear continuity with adjacent nodes, but may also extend sinuously across the entire length or width of the grid for longer continuity trends.

Figure 2:
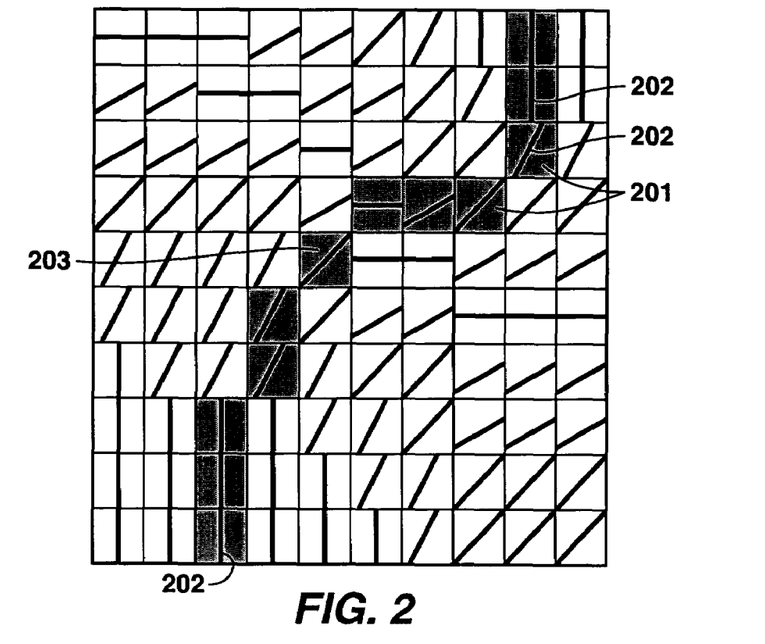
FIG. 2 depicts the blocks in a layer of a model to which an embodiment of the present invention is to be applied, along with the azimuths of spatial continuity associated with each block.

FIG. 2 depicts an example of a string derived from the process of FIG. 1, step 113. The shaded blocks 201 in FIG. 2 are associated with a trend that extends generally from the bottom left to the upper right in the figure. The orientation of the trend in each block is indicated by line 202 within each such block, and correspond to the azimuth of the trend in that block.

In the example of FIG. 2, only one trend, that associated with shaded blocks 201, is depicted. As indicated above, it will be understood that more than one trend may be present in any such layer, and each such trend may be modeled. To identify any such trend in a two-dimensional (in other words one layer) application of the present embodiment, a simplistic index reference system may be used. Consider, for example, a given node that has indexes in the grid (i, j) and another node that has indexes (i*, j*). If $|i-i^*| \leq 1$ and $|j-j^*| \leq 1$ then the two nodes are adjacent in space. The extension of this reference system to three dimensions for the k index would be analogous. Whether two-dimensional or three-dimensional applications are involved, connected nodes are those which are adjacent in space and are generally aligned along the local orientation of maximum continuity. Note that numerous options may be employed to determine whether connected nodes have an alignment along a local orientation of maximum continuity, and which therefore could be considered part of a string of nodes characterizing that continuity feature. For example, a simple observational system may be employed in which a preliminary geologic interpretation specifies presumed geologic flowpaths, and such flowpaths may be used to deduce continuity trends. Other options for determining connectedness of nodes will be apparent to one skilled in the art. A string of connected nodes will terminate when the edge of the geologic model or other defined boundary is reached, or when a node is reached that has previously been assigned to a string. An analyst may also specify additional conditions that will cause the string to terminate. This step is complete when all selected nodes in the geologic model have been assigned to strings, or when all trends in the model which are to be simulated have been assigned to strings.

Next, in FIG. 1, step 115, a one-dimensional array of the tentative geologic model rock-property values for each of the strings from step 113 is created. Each such array contains an identifier (for example, the indices) and the tentative rock-property value for each node in the string, and the entries in the array are in the order of nodes along the string. Although a string represents a one-dimensional curvilinear path through the model, creation of the array effectively "straightens" this path and allows for a one-dimensional spectral simulation to accurately characterize the spatial continuity of the trend being modeled.

In FIG. 1, step 116, a one-dimensional spectral simulation of the rock property is performed. This spectral simulation of these one-dimensional arrays itself comprises three steps. First, a Fourier transform is computed for the array. The phase of this transform is retained, and the amplitude of the transform is discarded. Next, an amplitude spectrum is assumed which represents the maximum-desired spatial continuity for this property within the string, in other words the desired continuity in the orientation represented by the assigned azimuths. This spatial continuity may be determined, for example, from a long-range variogram model for the region being analyzed, as may be determined from separately available data. Finally, the phase spectrum and the assumed amplitude spectrum are jointly inverted using an inverse Fourier transform to determine values for the one-dimensional array which accurately characterize the value of the property being modeled at each node in the string.

The strings of arrays determined in step 116 will range in length, depending on the characteristics of the underlying data and the calculation procedure used to determine azimuths and connected nodes. As will be understood to those skilled in the art, calculation of a Fourier transform of strings of data of different lengths will give results of differing accuracy. In the present method, the strings of nodes may be padded with zero values, to obtain strings of relatively consistent lengths, before the Fourier transform is computed. Generally, the padding will not result in strings that are longer than about twice the range of the maximum-desired spatial continuity, as determined from a long-range variogram model. Those skilled in the art will appreciate that the padding may use values other than zero, and that trial-and-error testing may be required to determine the most appropriate length to use in the Fourier transforms of the strings of data.

In FIG. 1, step 117, the simulated rock-property values for each string node are substituted for the values in the corresponding nodes in the tentative geologic model. The result, FIG. 1, step 122, is a new geologic model having anisotropic spatial continuity, in other words continuity that changes in direction according to the azimuths and/or dips in the trends that are specified in steps 112 and 113.

Figure 3:
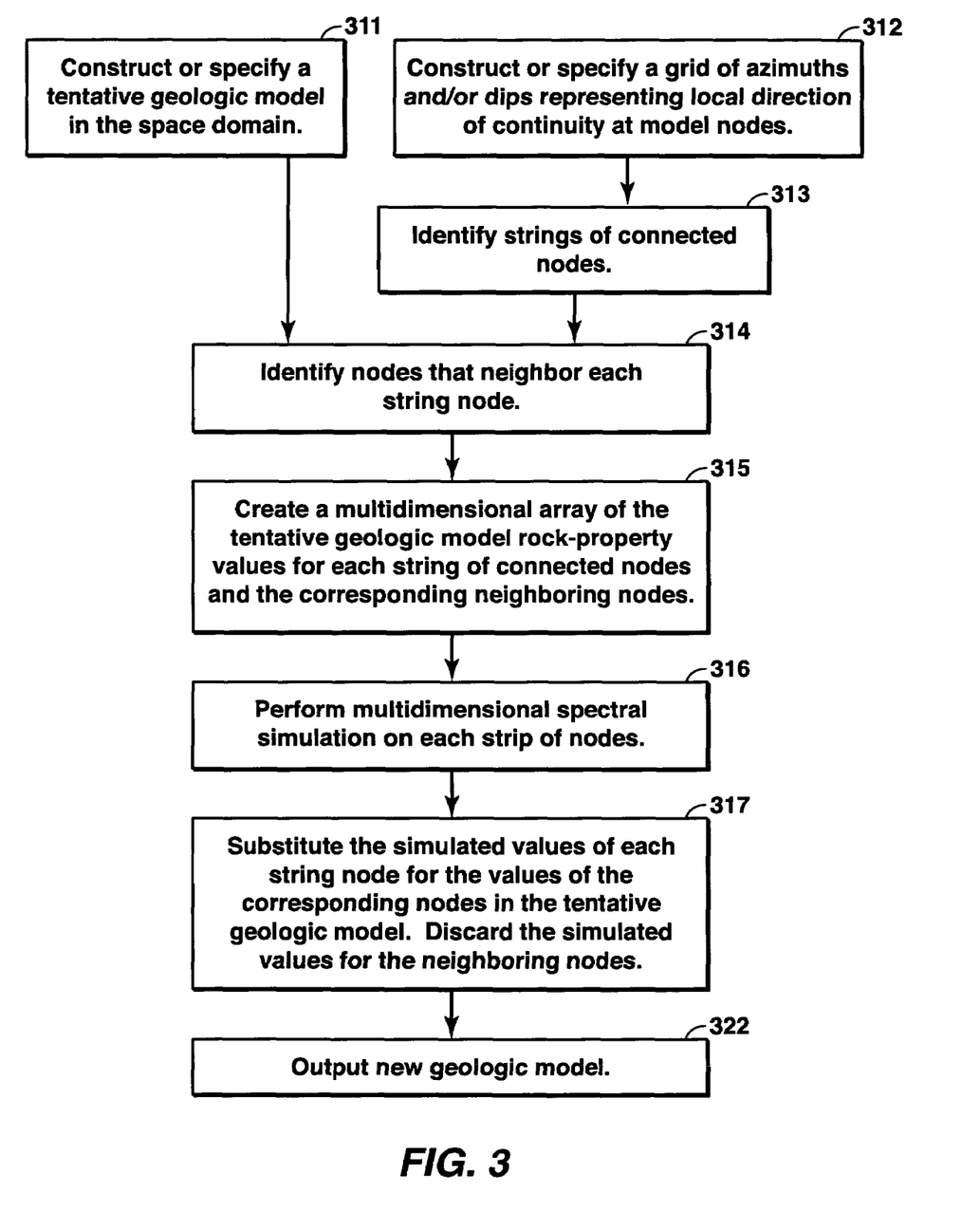
FIG. 3 depicts a flow chart of the steps for implementation of a second embodiment of the present invention.
Figure 4:
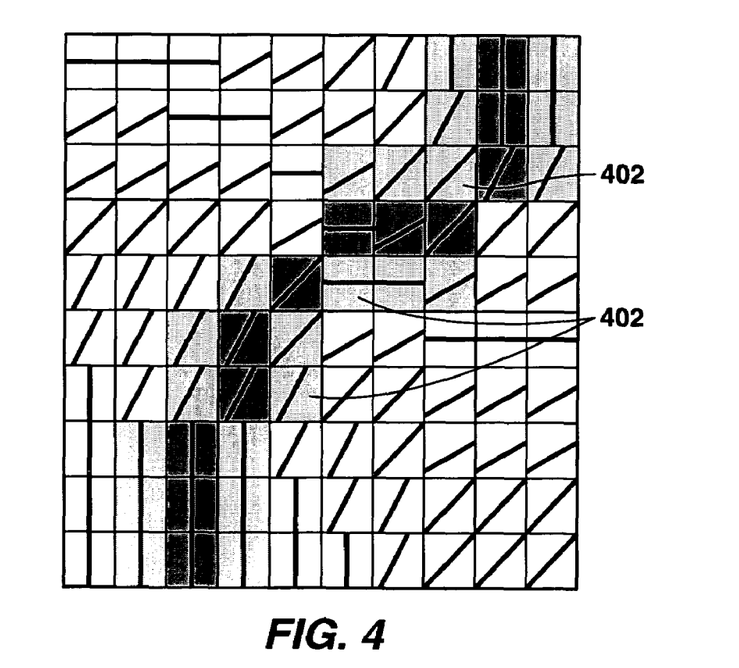
FIG. 4 depicts the blocks in a layer of a model to which the embodiment of FIG. 3, and an example of a strip of nodes analyzed in that embodiment.

In a second embodiment, it may be desired to simulate spatial continuity in two or three dimensions; one of these dimensions represented by the orientation of maximum continuity. FIG. 3 depicts the steps of this embodiment, and FIG. 4 depicts an example representative layer of a geologic model for which this embodiment may be appropriate.

The first three steps of this embodiment, FIG. 3, steps 311, 312, and 313, are identical to steps 111, 112, and 113 in FIG. 1. In this embodiment, once the strings of nodes have been identified, FIG. 3, step 313, nodes are identified that neighbor each node in the identified strings, FIG. 3, step 314. As depicted in FIG. 4, the strings of neighboring nodes that are identified in FIG. 3, step 314 are the lighter-shaded blocks 402. Neighboring nodes may be defined as adjacent nodes that are perpendicular to the string node, though other definitions could also be applied. Neighboring nodes may surround the string nodes on all sides, for example if a three-dimensional spectral simulation is to be performed, or may occur only within the two-dimensional plane containing the string nodes if a two-dimensional spectral simulation is to be performed. Using the index reference system described above, neighboring nodes may for example be defined as nodes that differ in (i,j,k) grid indices by no more than a magnitude of one from the node in question. If a specific analysis warrants, however, neighboring nodes may also include nodes that are two or more nodes away from the node in the string, in the dip and/or azimuth directions. The combination of string nodes plus all neighboring nodes is referred to as a "strip" of nodes. The required width/thickness of these strips will be a function of the desired range of continuity in those orientations; a longer range will require a wider strip. In FIG. 4, there are at least two neighboring nodes for every string node. Notice, however, that some string nodes may share the same neighboring node. Once again, the identifiers (i,j,k) for each node in every strip are used for reference.

Using the node identifiers from step 314, and the tentative geologic model from step 311, an array of tentative geologic-model rock-property values for each strip is specified, step 315. The array dimensions are identical to the dimensions of the strips. The arrays contain the identifier and the tentative rock-property value for each node in the strip, and are ordered according nodes in the string.

For each array created in step 315, a spectral simulation of the rock property is performed, step 316. This step follows the procedure discussed above in association with FIG. 1, step 116, except that the dimensions of the simulation will be identical to the dimensions of the array. In other words, for the example of FIG. 4, the spectral simulation will be two-dimensional, one dimension representing the direction along the azimuth of the string, and the second dimension orthogonal to that direction. The amplitude spectrum that is used in the simulation should represent the desired anisotropic spatial continuity for the rock property. The resulting arrays contain an identifier and a new simulated rock-property value for each node in each strip.

In step 317, the simulated values for the string nodes are substituted for the values in the corresponding nodes in the tentative geologic model. However, the simulated values for each of the neighboring nodes are discarded. This is because the neighboring nodes may belong to multiple strips, and therefore potentially have multiple values, since the neighboring nodes are attached to strings only after the strings are identified. An advantage of this strip-oriented embodiment is that the two-dimensional spectral simulation allows more accurate characterization of the spatial continuity of the nodes in the strings. The result is a new geologic model having anisotropic spatial continuity that changes in direction according to the input azimuths and/or dips, step 322.

A third embodiment of the present invention is described in the following paragraphs in the context of controlling the directional variation in continuity within each two-dimensional stratigraphic layer in a multi-layer geologic model.

Figure 5:
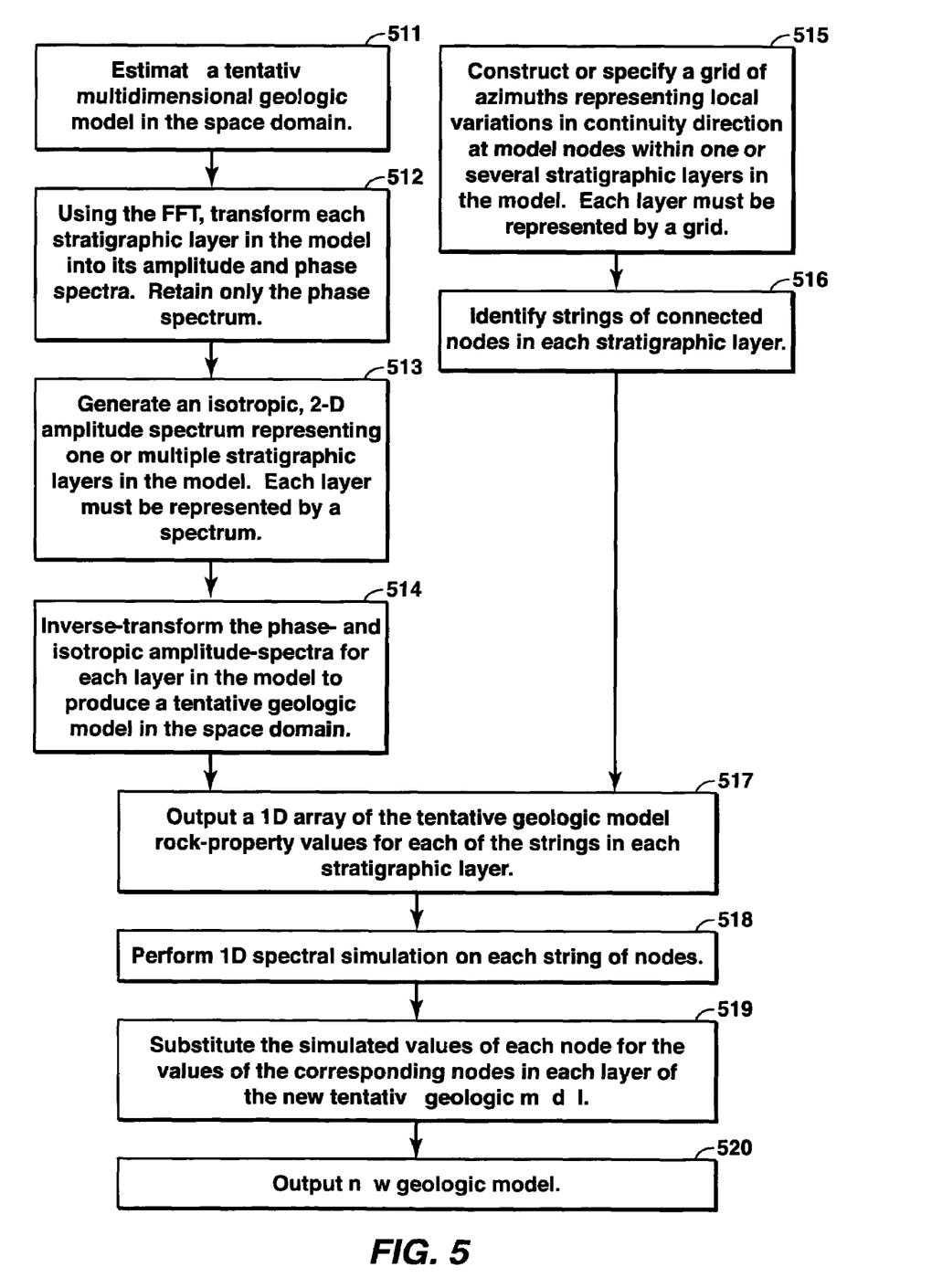
FIG. 5 depicts a flow chart of the steps for implementation of a third embodiment of the present invention.

However, as will be understood to those skilled in the art, this embodiment may be employed to control two-dimensional directional variations in continuity occurring along any arbitrary plane of the model, or three-dimensional directional variations in continuity occurring within the geologic-model volume. In addition, the description of this embodiment focuses on the computationally less burdensome "string" simulation method (FIG. 1 above), although extension of this description to apply to the alternative "strip" simulation method (FIG. 3 above) is straightforward. FIG. 5 depicts the detailed steps that comprise this embodiment.

In this embodiment of the present invention, the tentative geologic model is constructed in four steps, FIG. 5, steps 511 through 514. First, step 511, a tentative geologic model is prepared in any appropriate manner, as described above in conjunction with FIG. 1, step 111. Second, step 512, the fast Fourier transform is used to calculate the two-dimensional amplitude and phase spectra for each stratigraphic layer of the tentative geologic model. The amplitude spectrum is discarded and only the phase spectrum is retained.

Next, in step 513, an isotropic, two-dimensional amplitude spectrum for the stratigraphic layer is created. Note that a single amplitude spectrum may represent individual, or multiple, layers in the model. To simplify the description of this embodiment, but without limitation, a single spectrum will be referred to in the following as representing all layers. The spectrum is assumed, or generated from separately available data, and should characterize short-range continuity in the layer. Generation of this spectrum at this step enables this embodiment to generate a model with both short-range continuity (e.g. continuity in all directions other than directions along-azimuth) and long-range continuity (along the azimuths which are yet to be determined in this embodiment) accurately characterized. Inherent to this step is the assumption that all directions other than the azimuthal direction are modeled with the same short-range continuity. If the two-dimensional Fourier transform "strip" method discussed above is being employed, this step may not be necessary because the two-dimensional Fourier transform implicitly controls continuity in both the along-azimuth and the across-azimuth directions.

In step 514, for each stratigraphic layer, the amplitude spectrum from step 513 and the phase spectra from step 512 are inverse-transformed to produce each layer of a new, tentative geologic model in the space domain. This model is output as a set of 2D arrays, one array for each layer. Because the amplitude spectrum from step 513 is isotropic and short-range, these steps correctly model the desired short-range directional continuity in the layer.

Next, a grid of azimuths is prepared and strings of connected nodes are identified. In step 515, the grid of azimuths that represent variations in continuity direction within the stratigraphic layers in the geologic model are generated using any appropriate means. Depending on the nature of the region being modeled, a single grid could be used to represent all layers in the geologic model, or just one or several layers. For geologic modeling, this grid could be generated using local continuity interpretations from, for example, well or seismic data. The angle simulation method described by Xu in "Conditional Curvilinear Stochastic Simulation Using Pixel-based Algorithms," Math. Geology, V. 28, 1996 is one example and the generation of vector fields from flowpaths by Jones in "Using Flowpaths and Vector Fields in Object-Based Modeling," Computers & Geosciences, V. 27, pps 113-138, 2001 is a second example of methods for generating this grid.

Using the grid of azimuths from step 515, strings of nodes that are connected are identified in step 516. One approach for this identification is described below. For computational convenience in this approach, it is assumed that the grid spacing between nodes is one unit. Distances are defined in units of block dimensions, and the grid consists of blocks, and therefore nodes, that are equally spaced.

A first node is selected for analysis, see for example node 203 in FIG. 2, referred to in the following as P1. This node may be selected by randomly sampling from the 2D stratigraphic layer. Each such node will have an assigned azimuth, α, indicating the direction of maximum spatial continuity at that node. This direction is referred to as "upstream". The "downstream" direction is this azimuth plus 180 degrees. These directional references are for convenience and are not limiting. In the following, the direction α=0 refers to an azimuth pointing to the right in FIG. 2, although that convention is not limiting. As will be understood, the direction α=0 is typically correlated to the map north direction, which is also not limiting.

In the upstream direction, using the azimuth α at P1, a distance d is calculated that approximately spans a grid block in that direction, as follows:

$$d=|1/\sin\alpha|\ 45°<\alpha\leq 135°; 225°<\alpha\leq 315°$$

$$d=|1/\cos\alpha|\ \text{otherwise}$$

This calculation specifies a point, P2 which is a distance d in a direction a from P1 and is the next node in the string. The point P2 may not itself be exactly at a node of the grid; the node nearest to P2 is nevertheless defined to be the next node in the string. Note also that the calculation procedure for distance d specified above is for convenience, and other procedures may be employed, provided that a consistent approach for identifying the nodes in the string is involved. As noted above, blocks are assumed to have unit dimensions, and this calculation procedure inherently makes that assumption, which is not limiting.

Next, the azimuth of the node identified from the point P2 must be determined. The azimuth associated with that node will typically be used, but azimuths of several nearby nodes could be combined to provide the next azimuthal direction if so desired. Then, using that azimuth, the procedure is repeated to calculate the location of an additional point P3 and its corresponding node and azimuth.

This process is repeated to identify additional nodes in the string until the edge of the model or a boundary (for example, a facies boundary) is reached, until the string intersects a node already in a previously defined string, or until the next node has an assigned azimuth that is very different from that of the previous block (for example, greater than a pre-specified threshold difference). This last condition prevents sharp bends in the string, but has the intent of preventing discontinuous geologic features from being combined. The steps are also repeated, as necessary, for nodes in the downstream direction.

Once an entire string has been identified, the grid reference identifiers of all nodes in the string are assigned to a 1D array, in the order of furthest block upstream to furthest block downstream. These nodes cannot be assigned to any other string.

The entire process is repeated, FIG. 5, step 516, for additional strings, until all nodes are assigned to one of the plurality of strings. At noted above, the result may be that some strings extend a substantial distance across the layer of the model, and other strings may be very short and comprise very few individual nodes.

In FIG. 5, step 517, a one dimensional array of the tentative geologic model's rock-property values for each string of nodes is generated using the arrays of node identifiers from step 516 and the tentative geologic model layer's values from step 514. For calculational ease, the nodes in each string should still be in the order of furthest block upstream to furthest block downstream.

In step 518, a one-dimensional spectral simulation of the rock property is performed for each of the one-dimensional arrays of rock-property values from step 517. This step is as described above in association with FIG. 1, step 116.

Finally, FIG. 5, step 519, the values simulated in step 518 are substituted for the values in the corresponding nodes of the tentative geologic model resulting in a new geologic model having anisotropic spatial continuity that changes in direction according to the input azimuths, step 520.

As noted above, this and the prior embodiments of this method could be implemented in three dimensions. For example, in step 512, the tentative geologic model could be transformed into its three-dimensional amplitude and phase spectra, with only the phase spectrum retained. In this embodiment the third dimension would be vertical. In step 513, a three-dimensional amplitude spectrum would then be generated. This spectrum would be isotropic in the stratigraphic plane (x-y plane) but represent the desired vertical continuity in the vertical direction (orthogonal to the stratigraphic plane), as a result of the z-direction continuity control to which the tentative model is built. In step 514, the three-dimensional phase and amplitude spectra would be inverse transformed to produce the new tentative three-dimensional geologic model in the space domain. Subsequent steps could then involve either of two sequences of analysis approaches. First, the remaining steps could involve one dimension in which one-dimensional transforms of each string could be computed generally as described above. Second, the remaining steps could be two-dimensional. In this second approach, the nodes identified in step 516 would involve "curtains" of nodes. In this approach strings of nodes are identified in an uppermost layer of interest in the model. Thereafter, all nodes in the model that have the identical i,j indices as each identified string are assigned to a two-dimensional array in which the second dimension is vertical (perpendicular to the layer). Using this curtain-based approach, the rock property values in step 517 would be extracted from the three-dimensional volume created in step 514. In step 518 of this approach, the spectral simulation would be two-dimensional. The result of the process would be a model with control in all three dimensions.

Figure 6A:
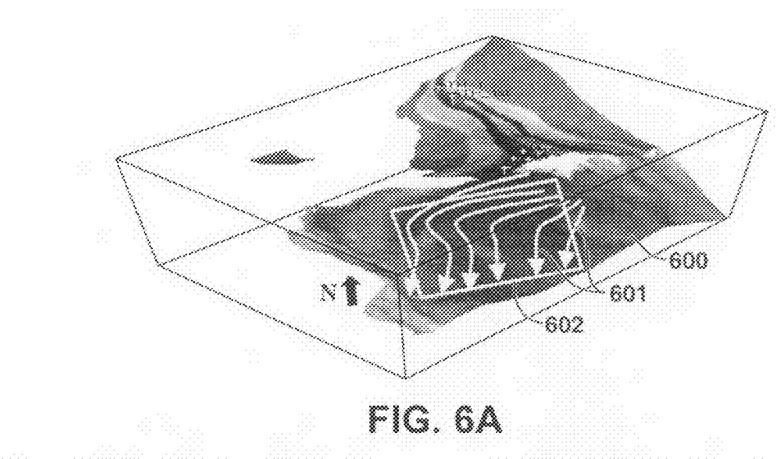
FIG. 6A depicts a seismic interpretation of the surface of a stratigraphic layer in a fan-shaped deepwater reservoir.
Figure 6B:
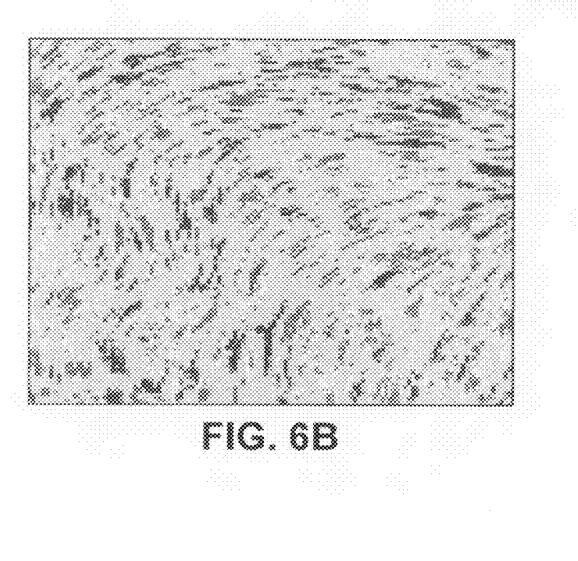
FIG. 6B depicts the spatially-varying continuity model which results from application of the present invention to the surface of FIG. 6A.

An example application of this invention is shown in FIG. 6. FIG. 6A is a seismic interpretation of the surface 600 of a stratigraphic layer in a fan-shaped deepwater reservoir. Lines 601 drawn on surface 600 indicate the directions of maximum rock-property continuity, as interpreted, for example, by a seismic interpreter. The local azimuth angles of maximum continuity inherent to these interpreted lines were gridded so that a continuity-azimuth value was assigned to each model-grid node within the area outlined by box 602 in FIG. 6A. Using an embodiment of this invention, a tentative 2D geologic model was generated over the area outlined by box 602 for layer 600. This tentative geologic model was then transformed into its amplitude and phase spectra, retaining only the phase spectrum. A 2D isotropic amplitude spectrum was generated which represented the shortest-range continuity desired for the modeled rock property in layer 600. This continuity range was assumed to be three model blocks. This amplitude spectrum and the retained phase spectrum were then inverse-transformed to produce a new, tentative, 2D geologic model of this layer. The azimuth grid was used to identify strings of nodes and, for each string, the tentative geologic-model rock-property values assigned to these nodes were modified using 1D spectral simulation. The 1D amplitude spectrum that was used represented the longest-range of continuity desired for the modeled rock property in layer 600. This long-range continuity was assumed to be twenty model blocks. The simulated values were substituted for the values in the corresponding nodes in the tentative geologic model, resulting in a new 2D geologic model having anisotropic spatial continuity that changes in direction according to the input azimuths, as indicated in FIG. 6B. The trends of continuity deriving from the individual strings of nodes and their associated azimuths, in turn deriving from lines 601, are indicated in FIG. 6B by the shaded flowpaths which trend from right to left in the upper right-hand portion of the figure, and turn and trend from top to bottom in the middle and lower portion of the figure. This modeling is substantially similar to the interpreted azimuths depicted in FIG. 6A.

Figure 6C:
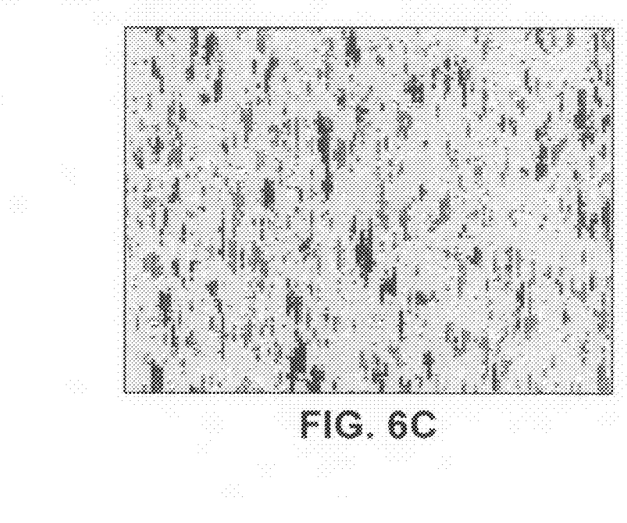
FIG. 6C depicts the fixed spatial continuity model which results from application of a prior art method to the surface of FIG. 6A.

For comparison, a traditional 2-D spectral-simulation method was also applied to the data of FIG. 6A. An anisotropic amplitude spectrum representing the stratigraphic layer was generated. This spectrum represented a long-range continuity of twenty blocks, but in the traditional method this long-range continuity is limited to the N-S direction (top to bottom in the figure). Similarly, the short-range continuity was again assumed to be three blocks, but this is limited to the E-W direction (right-to-left). As will be understood to those skilled in the art any other two orthogonal directions could have been chosen. This spectrum and the phase spectrum generated from the tentative 2D geologic model were inverse-transformed, resulting in a new 2D geologic model, which is depicted in FIG. 6C. Note that this use of a traditional spectral simulation method does not allow the direction of maximum continuity to vary over the geologic model region, and the continuity trend lines are limited to a top-to-bottom directional pattern throughout the modeled layer.

It should be understood that the preceding is merely a detailed description of specific embodiments of this invention. Other embodiments may be employed and numerous changes to the disclosed embodiments may be made in accordance with the disclosure herein without departing from the spirit or scope of the present invention. Furthermore, each of the above embodiments is within the scope of the present invention. The preceding description, therefore, is not meant to limit the scope of the invention. Rather, the scope of the invention is to be determined only by the appended claims and their equivalents.

We claim:

1. A computer implemented method of generating a geologic model of a rock property useful in petroleum exploration and production, which model has directionally varying continuity, comprising:

a) specifying a tentative model of a subsurface region of interest for said geologic model;

b) identifying connected strings of nodes within said tentative model, wherein a grid of azimuths is used to identify said connected strings of nodes;

c) performing a spectral simulation on each of said connected strings of nodes resulting in a simulated value of the rock property at each node;

d) updating said tentative model by substituting the simulated rock-property values for the values in the corresponding nodes in the tentative model.

2. The method of claim 1, wherein said tentative model is subdivided into layers, and steps b), c) and d) are performed on a layer-by-layer basis.

3. The method of claim 1, wherein for each of said connected strings of nodes said spectral simulation comprises:
   a) determining a phase spectrum from a Fourier transform of each of said connected strings of nodes;
   b) specifying an amplitude spectrum which represents the maximum-desired spatial continuity for each of said connected strings of nodes; and
   c) inverse Fourier transforming said phase spectrum and said amplitude spectrum to determine updated data values for said nodes in each of said connected strings of nodes.

4. The method of claim 3, wherein one or more of each of said connected strings of nodes is padded with additional data values prior to calculation of the Fourier transform of each of said connected strings of nodes.

5. A computer implemented method of generating a geologic model of a rock property useful in petroleum exploration and production, which model has directionally varying continuity, comprising:
   a) specifying a tentative model of a subsurface region of interest for said geologic model having one or more layers;
   b) for each of said layers in said tentative model,
      [i] specifying a grid of azimuths for nodes in said tentative model;
      [ii] using said grid to identify connected strings of nodes within said tentative model;
      [iii] performing a spectral simulation on each of said connected strings of nodes, each spectral simulation involving a determination of a phase spectrum from a Fourier transform of each of said connected strings of nodes, a specification of an amplitude spectrum which represents the maximum-desired spatial continuity for each of said connected strings of nodes, and the inverse Fourier transform of said phase spectrum and said amplitude spectrum to provide a simulated value of the rock property at each node; and
      [iv] updating said tentative model by substituting the simulated rock-property values for the values in the corresponding nodes in the tentative model.

6. The method of claim 5, wherein one or more of each of said connected strings of nodes is padded with additional data values prior to calculation of the Fourier transform of said one or more of each of said connected strings of nodes.

7. The method of claim 1, wherein neighboring nodes to each said node in each of said connected strings of nodes are identified and further wherein said spectral simulation is multidimensional.

8. The method of claim 5, wherein neighboring nodes to each said node in each of said connected strings of nodes are identified and wherein said spectral simulation is two-dimensional.

9. The method of claim 1, wherein said tentative model is specified from a spectral simulation comprising:
   a) determination of a phase spectrum from a Fourier transform of a first estimate of said tentative model;
   b) specification of an amplitude spectrum for said tentative model; and
   c) inverse Fourier transforming said phase spectrum and said amplitude spectrum to determine said tentative model.

10. The method of claim 9, where said amplitude spectrum characterizes a short-range continuity desired in said tentative model.

11. The method of claim 9, where said spectral simulation is applied on a layer-by-layer basis to each of one or more layers of said tentative model.

12. The method of claim 9, where said tentative model is specified from a three-dimensional spectral simulation.

13. The method of claim 12, wherein said identified connected strings of nodes are used to identify curtains of connected nodes, and two-dimension spectral simulation is applied to each of said curtains.

14. The method of claim 1, wherein a grid of dips is used to identify said connected strings of nodes.

15. The method of claim 1, wherein a combined grid of dips and azimuths are used in three-dimensions to identify said connected strings of nodes.

16. The method of claim 1, wherein said grid of azimuths corresponds to blocks in said tentative model.

17. The method of claim 1, wherein said identifying connected strings of nodes within said tentative model is repeated until each node within the tentative model is associated with one of the connected strings of nodes.

18. The method of claim 1, wherein said geologic model is a model of a geologic rock property selected from a group consisting of: lithology; porosity; acoustic impedance; permeability; and water saturation.

* * * * *